US011477087B2

(12) United States Patent
Hotta et al.

(10) Patent No.: US 11,477,087 B2
(45) Date of Patent: Oct. 18, 2022

(54) MONITORING APPARATUS, NETWORK SYSTEM, TOPOLOGY MANAGEMENT METHOD, AND COMPUTER READABLE MEDIUM

(71) Applicant: Mitsubishi Electric Corporation, Tokyo (JP)

(72) Inventors: Yoshifumi Hotta, Tokyo (JP); Sachiko Taniguchi, Tokyo (JP); Ryuma Matsushita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/026,753

(22) Filed: Sep. 21, 2020

(65) Prior Publication Data
US 2021/0006470 A1 Jan. 7, 2021

Related U.S. Application Data

(63) Continuation of application No. PCT/JP2018/017169, filed on Apr. 27, 2018.

(51) Int. Cl.
H04L 41/12 (2022.01)
H04L 12/42 (2006.01)
H04L 45/02 (2022.01)

(52) U.S. Cl.
CPC .............. H04L 41/12 (2013.01); H04L 12/42 (2013.01); H04L 45/02 (2013.01); H04L 2012/421 (2013.01)

(58) Field of Classification Search
CPC ......... H04L 41/12; H04L 12/42; H04L 45/02; H04L 2012/421; H04L 41/0853; H04L 41/0866; H04L 45/18; H04L 45/20
See application file for complete search history.

(56) References Cited

U.S. PATENT DOCUMENTS

2003/0145254 A1 7/2003 Ookawa et al.
2005/0237948 A1* 10/2005 Wan .................. H04L 61/35
370/254
(Continued)

FOREIGN PATENT DOCUMENTS

CN 101409666 A 4/2009
CN 103403720 A 11/2013
(Continued)

OTHER PUBLICATIONS

International Search Report for International Application No. PCT/JP2018/048484, dated Feb. 5, 2019.
(Continued)

Primary Examiner — Jamal Javaid
Assistant Examiner — Shawn D Miller
(74) Attorney, Agent, or Firm — Birch, Stewart, Kolasch & Birch, LLP

(57) ABSTRACT

An information obtaining unit (53) of a monitoring apparatus (40) obtains from each node, topology map information created in each node by an exchange of information and sharing of information between nodes that belong to a ring network. The topology map information is information that indicates a connection relation between the nodes in the ring network. A topology comparison unit (54) of the monitoring apparatus (40) compares the topology map information obtained from each node by the information obtaining unit (53) with topology definition information retained in a memory (42) beforehand, and determines whether or not a configuration of the ring network is according to design. The topology definition information is information that defines the connection relation between the nodes in the ring network.

10 Claims, 14 Drawing Sheets

(56) References Cited

U.S. PATENT DOCUMENTS

| | | | |
|---|---|---|---|
| 2006/0092856 A1 | 5/2006 | Mitsumori | |
| 2007/0050485 A1 | 3/2007 | Zolfaghari | |
| 2011/0022725 A1 | 1/2011 | Farkas | |
| 2011/0080915 A1* | 4/2011 | Baykal | H04L 12/4641 370/395.53 |
| 2011/0176550 A1* | 7/2011 | Wang | H04L 12/42 370/392 |
| 2012/0185592 A1 | 7/2012 | Nakamura | |
| 2013/0216227 A1 | 8/2013 | Naito et al. | |
| 2014/0082116 A1 | 3/2014 | Sasaki et al. | |
| 2014/0181320 A1 | 6/2014 | Farkas | |
| 2014/0334313 A1 | 11/2014 | Nakamura | |
| 2015/0138950 A1* | 5/2015 | Ma | H04L 12/42 370/223 |
| 2017/0353244 A1 | 12/2017 | Takeshita et al. | |
| 2018/0270083 A1* | 9/2018 | Murray | H04L 69/40 |

FOREIGN PATENT DOCUMENTS

| | | |
|---|---|---|
| EP | 2 688 002 A1 | 1/2014 |
| JP | 2003-224571 A | 8/2003 |
| JP | 2006-129071 A | 5/2006 |
| JP | 2009-147653 A | 7/2009 |
| JP | 2011-515057 A | 5/2011 |
| JP | 2012-175425 A | 9/2012 |
| JP | 2013-46090 A | 3/2013 |
| JP | 2013-46091 A | 3/2013 |
| JP | 2013-207316 A | 10/2013 |
| WO | WO 2011/037004 A1 | 3/2011 |
| WO | WO 2012/042623 A1 | 4/2012 |
| WO | WO 2016/103632 A1 | 6/2016 |

OTHER PUBLICATIONS

Indian Office Action for Indian Application No. 202047042728, dated Aug. 30, 2021, with English translation.
International Search Report issued in PCT/JP2018/017169 (PCT/ISA/210), dated Jun. 19, 2018.
Kitayama et al., "A Study RPR for multiple network failure", IEICE Technical Report, Japan, The Institute of Electronics, Information and Communication Engineers, vol. 107, No. 530, Mar. 6, 2008, pp. 15-20.
Notice of Reasons for Refusal, Japanese Office Action issued in Application No. 2018-546645, dated Oct. 16, 2018.
Office Action dated May 26, 2022 issued in corresponding Chinese Application No. 201880100342.7 with an English Translation.
Office Action dated Jul. 12, 2022 issued in corresponding Indian Application No. 202147027774 with English Translation.

\* cited by examiner

Fig. 6

| SERIAL NUMBER | FRAME STORAGE INFORMATION | CONTENTS |
|---|---|---|
| 1 | ERP NODE ID | MAC ADDRESS OF TRANSMISSION SOURCE |
| 2 | RING ID OF ERP NODE | RING ID SET IN NODE DEVICE |
| 3 | NODE TYPE OF ERP NODE | ONE OF NODE TYPES HEREINAFTER<br>GENERAL NODE<br>INTER-NETWORK NODE<br>RPL ADJACENT NODE<br>RPL OWNER NODE |
| 4 | TRANSMISSION PORT OF ERP NODE | PORT ID OF PORT WHERE TRANSMISSION SOURCE OUTPUTTED FRAME |

Fig. 8

| SERIAL NUMBER | FRAME STORAGE INFORMATION | CONTENTS | REMARKS |
|---|---|---|---|
| 1 | TRANSMISSION SOURCE ERP NODE ID | MAC ADDRESS OF TRANSMISSION SOURCE | TRANSMISSION SOURCE ERP NODE INFORMATION |
| 2 | RING ID OF TRANSMISSION SOURCE ERP NODE | RING ID SET IN NODE DEVICE | |
| 3 | ADJACENT NODE COUNT | NUMBER OF ADJACENT NODES DETECTED | |
| 4 | ADJACENT ERP CONNECTION PORT | PORT ID OF PORT TO WHICH ADJACENT NODE IS CONNECTED | ADJACENT ERP NODE INFORMATION NOTIFY IN AMOUNT OF ADJACENT NODE COUNT |
| 5 | ADJACENT ERP NODE ID | MAC ADDRESS OF ADJACENT NODE | |
| 6 | RING ID OF ADJACENT ERP NODE | RING ID SET IN NODE DEVICE | |
| 7 | NODE TYPE OF ADJACENT ERP NODE | ONE OF NODE TYPES HEREINAFTER GENERAL NODE INTER-NETWORK NODE RPL ADJACENT NODE RPL OWNER NODE | |
| 8 | TRANSMISSION PORT OF ADJACENT ERP NODE | PORT ID OF PORT WHERE ADJACENT NODE OUTPUTTED FRAME | |

Fig. 10

| MAC ADDRESS | HOP COUNT | | INTER-NETWORK CONNECTION | | NODE TYPE | RING ID | INTER-NETWORK NODE MAC ADDRESS | REMARKS |
|---|---|---|---|---|---|---|---|---|
| | MAIN LINE PORT 1 | MAIN LINE PORT 2 | PORT A | PORT B | | | | |
| 000000000106 | 0 | 0 | Null | Null | GENERAL | 1 | Null | EN106 |
| 000000000107 | 1 | 7 | 1 | 2 | INTER-NETWORK | 1 | Null | EN107 |
| 000000000108 | 2 | 6 | Null | Null | GENERAL | 1 | Null | EN108 |
| 000000000101 | 3 | 5 | Null | Null | RPL OWNER | 1 | Null | EN101 |
| 000000000102 | 4 | 4 | Null | Null | RPL ADJACENT | 1 | Null | EN102 |
| 000000000103 | 5 | 3 | Null | Null | GENERAL | 1 | Null | EN103 |
| 000000000104 | 6 | 2 | Null | Null | GENERAL | 1 | Null | EN104 |
| 000000000105 | 7 | 1 | 3 | 4 | INTER-NETWORK | 1 | Null | EN105 |
| 000000000201 | 2 | 8 | 3 | 4 | INTER-NETWORK | 2 | 000000000107 | EN201 |
| 000000000301 | 8 | 2 | 1 | 2 | INTER-NETWORK | 3 | 000000000105 | EN301 |

32

MONITORING APPARATUS, NETWORK SYSTEM, TOPOLOGY MANAGEMENT METHOD, AND COMPUTER READABLE MEDIUM

CROSS REFERENCE TO RELATED APPLICATIONS

This application is a Continuation of PCT International Application No. PCT/JP2018/017169, filed on Apr. 27, 2018, which is hereby expressly incorporated by reference into the present application.

TECHNICAL FIELD

The present invention relates to a monitoring apparatus, a network system, a topology management method, and a monitoring program.

BACKGROUND ART

An RPR and an ERP are available as protocols to be used in a ring network that perform deliveries to a terminal connected to a network by multiplexing a user frame in the ring network and carry out switching of routes by 50 ms when a network failure occurs. "RPR" is an abbreviation for Resilient Protection Ring. "ERP" is an abbreviation for Ethernet (registered trademark) Ring Protection. Standardization is completed for the RPR as IEEE 802.17 and for the ERP as ITU-T G.8023. Since there is a topology detection function based on Topology Discovery in an RPR protocol, a node is able to perform the topology detection in a ring, but there is no rule for a topology detection in a case where a multi-ring network is configured. There is no rule for a topology detection function in an ERP protocol.

In a method described in Patent Literature 1, when a multi-ring network is to be configured with a conventional RPR device in addition to the topology detection function of the RPR, information indicating that a node that makes a connection between rings is a redundant node is transmitted, and each node in the ring creates a topology table including information on this redundant node. Based on this topology table, each node delivers a packet and monitors a state.

CITATION LIST

Patent Literature

Patent Literature 1: JP 2006-129071 A

SUMMARY OF INVENTION

Technical Problem

In the method described in Patent Literature 1, a control frame is forwarded while a TTL field is subtracted and a hop count from a transmission source node is calculated based on a value of TTL to generate a topology table. In this method, whether or not a topology table each node retains in the ring is consistent between the nodes in the ring cannot be easily determined. "TTL" is an abbreviation for Time to Live.

The present invention aims to make confirmation of whether or not a configuration of a ring network is of a desired configuration be done easily.

Solution to Problem

A monitoring apparatus according to one aspect of the present invention includes:

an information obtaining unit to obtain from each node, topology map information that is created in each node by an exchange of information and sharing of information between nodes that belong to a ring network, and that indicates a connection relation between the nodes in the ring network; and a topology comparison unit to compare the topology map information obtained from each node by the information obtaining unit with topology definition information retained in a memory beforehand that defines the connection relation between the nodes in the ring network, and to determine whether or not a configuration of the ring network is according to design.

Advantageous Effects of Invention

In the present invention, by comparing topology map information created in each node in a ring network with topology definition information retained in a memory beforehand, whether or not a configuration of the ring network is according to design is determined. Consequently, according to the present invention, whether or not a configuration of a ring network is of a desired configuration can be easily confirmed.

BRIEF DESCRIPTION OF DRAWINGS

FIG. 6 is a table illustrating a format of adjacent node information according to Embodiment 1.

FIG. 8 is a table illustrating a format of other node information according to Embodiment 1.

FIG. 10 is a table illustrating an example of a topology map table according to Embodiment 1.

DESCRIPTION OF EMBODIMENTS

Figure 1:
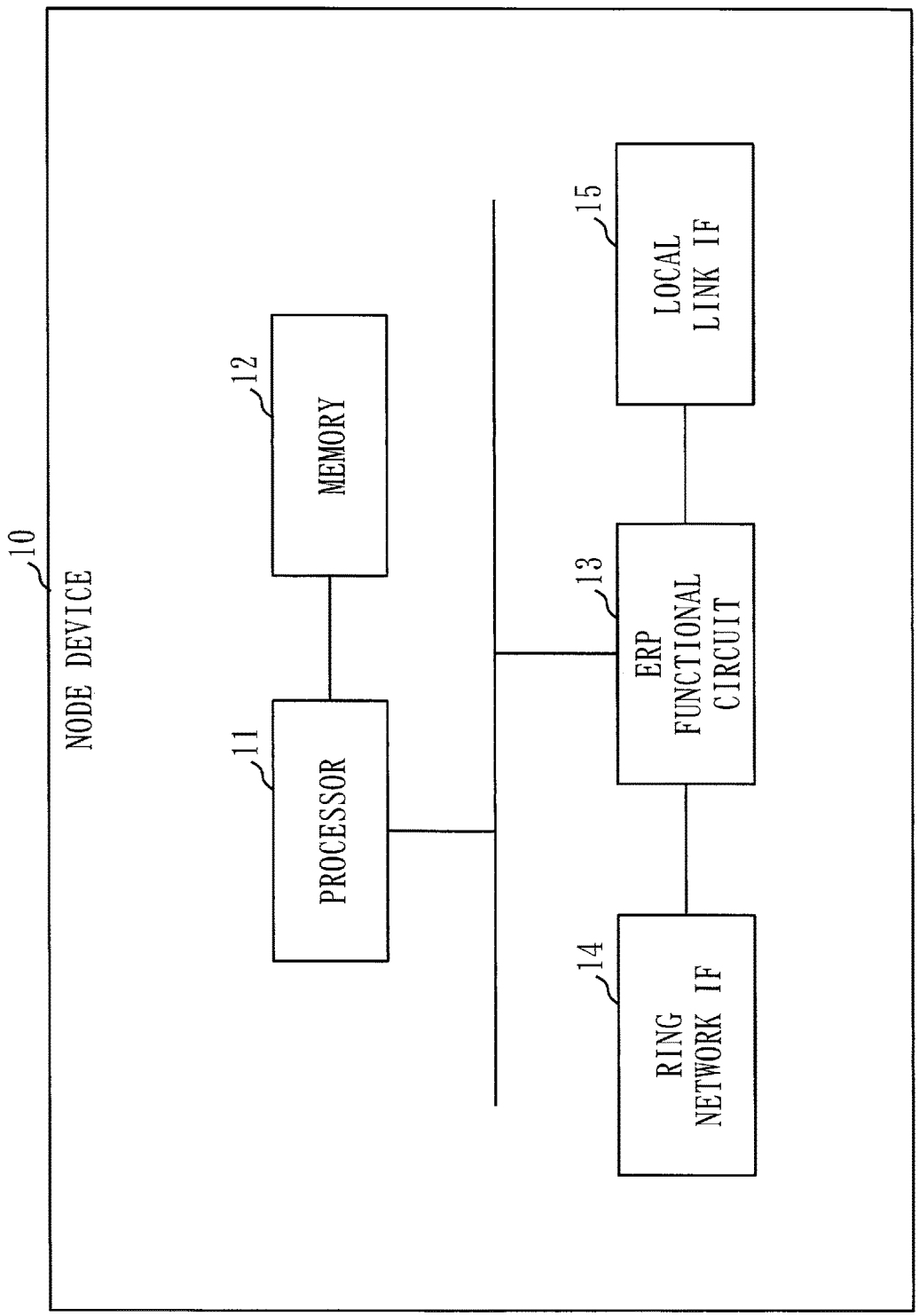
FIG. 1 is a block diagram illustrating a hardware configuration of a node device according to Embodiment 1.

Hereinafter, an embodiment of the present invention will be described, using the drawings. The same or corresponding portions are denoted by the same reference numerals throughout the drawings. Descriptions of the same or corresponding portions will be suitably omitted or simplified in the description of the embodiment. The present invention is not limited to the embodiment to be described hereinafter, and various modifications are possible as necessary. For example, the embodiment to be described hereinafter may partially be carried out.

Embodiment 1

This embodiment will be described using FIG. 1 to FIG. 12.

Description of Configuration

A configuration of a node device 10 according to this embodiment will be described by referring to FIG. 1 and FIG. 2.

The node device 10 is a computer.

As illustrated in FIG. 1, the node device 10 includes a processor 11 and also other hardware such as a memory 12, an ERP functional circuit 13, a ring network interface 14, and a local link interface 15. The processor 11 is connected to other hardware via signal lines and controls these other hardware.

Figure 2:
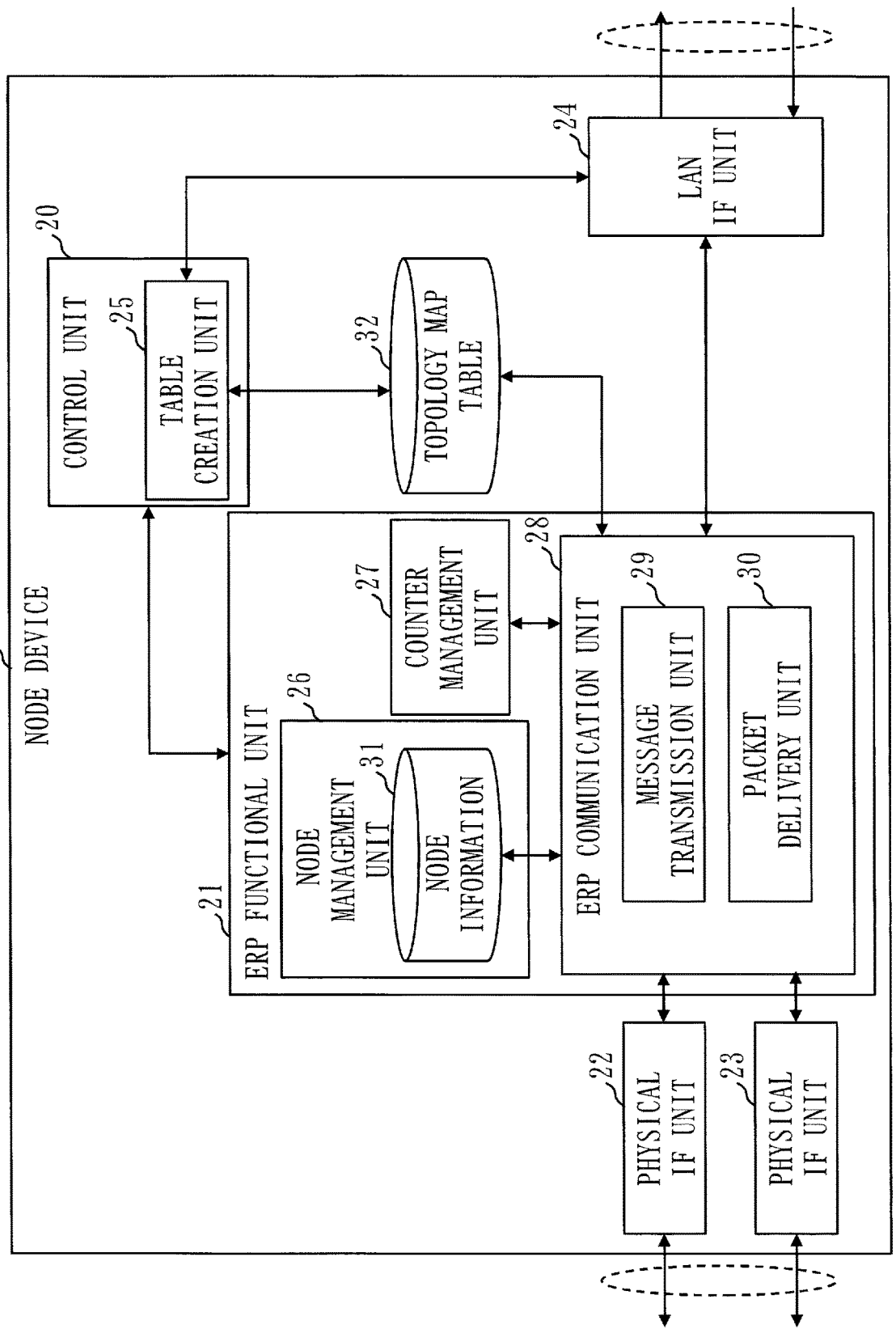
FIG. 2 is a block diagram illustrating a functional configuration of the node device according to Embodiment 1.

As illustrated in FIG. 2, the node device 10 includes as functional elements, a control unit 20, an ERP functional unit 21, a physical interface unit 22, a physical interface unit 23, and a LAN interface unit 24. "LAN" is an abbreviation for Local Area Network. The control unit 20 includes a table creation unit 25. The ERP functional unit 21 includes a node management unit 26, a counter management unit 27, and an ERP communication unit 28. The ERP communication unit 28 includes a message transmission unit 29 and a packet delivery unit 30.

The control unit 20 controls the ERP functional unit 21 and has a function to generate topology information of a ring network. The table creation unit 25 of the control unit 20 has a function to create, as topology information of a ring network that the node device 10 recognized, a topology map table 32 that has recorded information of an ERP node connected to the ring network. Functions of the control unit 20 are realized by software. Specifically, the functions of the control unit 20 are realized by a control program. The control program is a program that makes a computer execute processes performed by the control unit 20 as a control process. The control program may be provided being recorded in a computer-readable medium or provided being stored in a recording medium, or provided as a program product.

The ERP functional unit 21 has an ERP function. The node management unit 26 of the ERP functional unit 21 has a function to collect node information 31 of an adjacent node connected to the node device 10. The counter management unit 27 of the ERP functional unit 21 has a function to calculate a unique value indicating contents of an entry of the topology map table 32 as a topology counter. The message transmission unit 29 of the ERP functional unit 21 has a function to frame and transmit a message that the control unit 20, the node management unit 26, and the counter management unit 27 are to use. The packet delivery unit 30 has a function to separate and deliver to each functional element a frame that the control unit 20, the node management unit 26, and the counter management unit 27 are to use, and to forward a user frame to the physical interface unit 22, the physical interface unit 23, and the LAN interface unit 24. Functions of the ERP functional unit 21 are realized by the ERP functional circuit 13.

The physical interface unit 22 and the physical interface unit 23 have a ring interface function for connecting to a node adjacent to the node device 10 in the ring network. Functions of the physical interface unit 22 and the physical interface unit 23 are realized by the ring network interface 14.

The LAN interface unit 24 has a local interface function for connecting to a terminal not illustrated in the drawings or for connecting to a node of a ring network other than the ring network to where the node device 10 belongs. Functions of the LAN interface unit 24 are realized by the local link interface 15.

The processor 11 is a device that executes the control program. The processor 11 is, for example, a CPU. "CPU" is an abbreviation for Central Processing Unit.

The memory 12 is a device that stores the control program beforehand or temporarily. The memory 12 is, for example, a RAM, a flash memory, or a combination of these. "RAM" is an abbreviation for Random Access Memory.

The node information 31 and the topology map table 32 are also stored in the memory 12.

The ERP functional circuit 13 is a circuit that realizes the functions of the ERP functional unit 21. The ERP functional circuit 13 is, for example, a single circuit, a composite circuit, a programmed processor, a parallel programmed processor, a logic IC, a GA, an FPGA, an ASIC, or a combination of some or all of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

The ring network interface 14 includes a receiver that receives data from a node adjacent to the node device 10 in the ring network and a transmitter that transmits data to that node that is adjacent. The ring network interface 14 is, for example, a communication chip or an NIC. "NIC" is an abbreviation for Network Interface Card.

The local link interface 15 includes a receiver that receives data from a node of a ring network other than the ring network to where the node device 10 belongs and a transmitter that transmits data to a node of that other ring network. The local link interface 15 is, for example, a communication chip or an NIC.

The control program is read into the processor 11 from the memory 12 and executed by the processor 11. Not only the control program, but also an OS is stored in the memory 12. "OS" is an abbreviation for Operating System. The processor 11 executes the control program while executing the OS. A part or all of the control program may be built into the OS.

The control program and the OS may be stored in an auxiliary storage device. The auxiliary storage device is, for example, an HDD, a flash memory or a combination of these. "HDD" is an abbreviation for Hard Disk Drive. When stored in the auxiliary storage device, the control program and the OS are loaded into the memory 12 and executed by the processor 11.

The node device 10 may include a plurality of processors that replace the processor 11. These plurality of processors share the execution of the control program. Each processor is, for example, a CPU.

Data, information, signal values, and variable values used, processed, or outputted by the control program are stored in the memory 12, the auxiliary storage device, or a register or a cache memory in the processor 11.

A configuration of a monitoring apparatus 40 according to this embodiment will be described by referring to FIG. 3 and FIG. 4.

The monitoring apparatus 40 is a computer.

Figure 3:
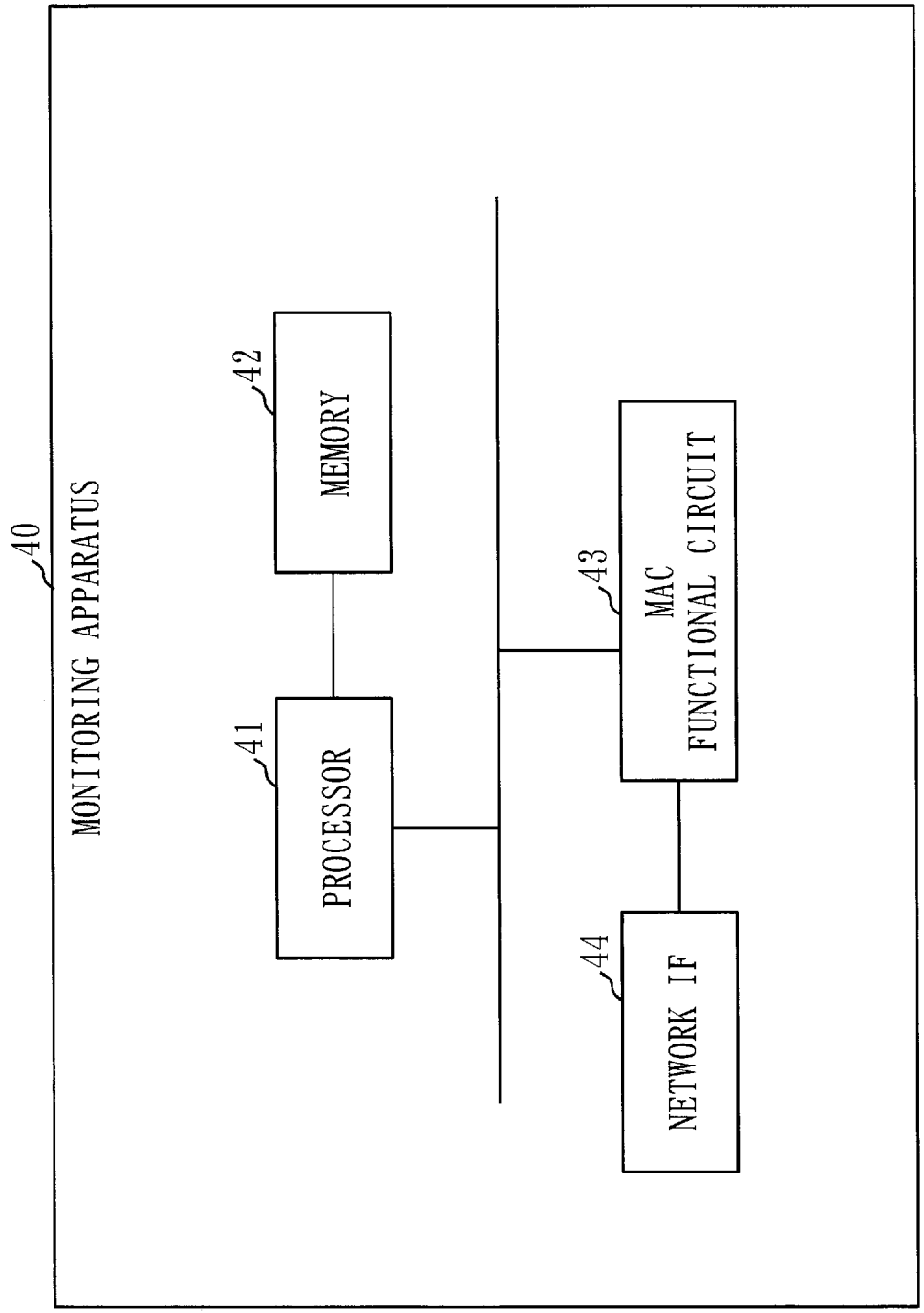
FIG. 3 is a block diagram illustrating a hardware configuration of a monitoring apparatus according to Embodiment 1.

As illustrated in FIG. 3, the monitoring apparatus 40 includes a processor 41 and also includes other hardware such as a memory 42, a MAC functional circuit 43, and a network interface 44. "MAC" is an abbreviation for Media Access Control. The processor 41 is connected to other hardware via signal lines and controls these other hardware.

Figure 4:
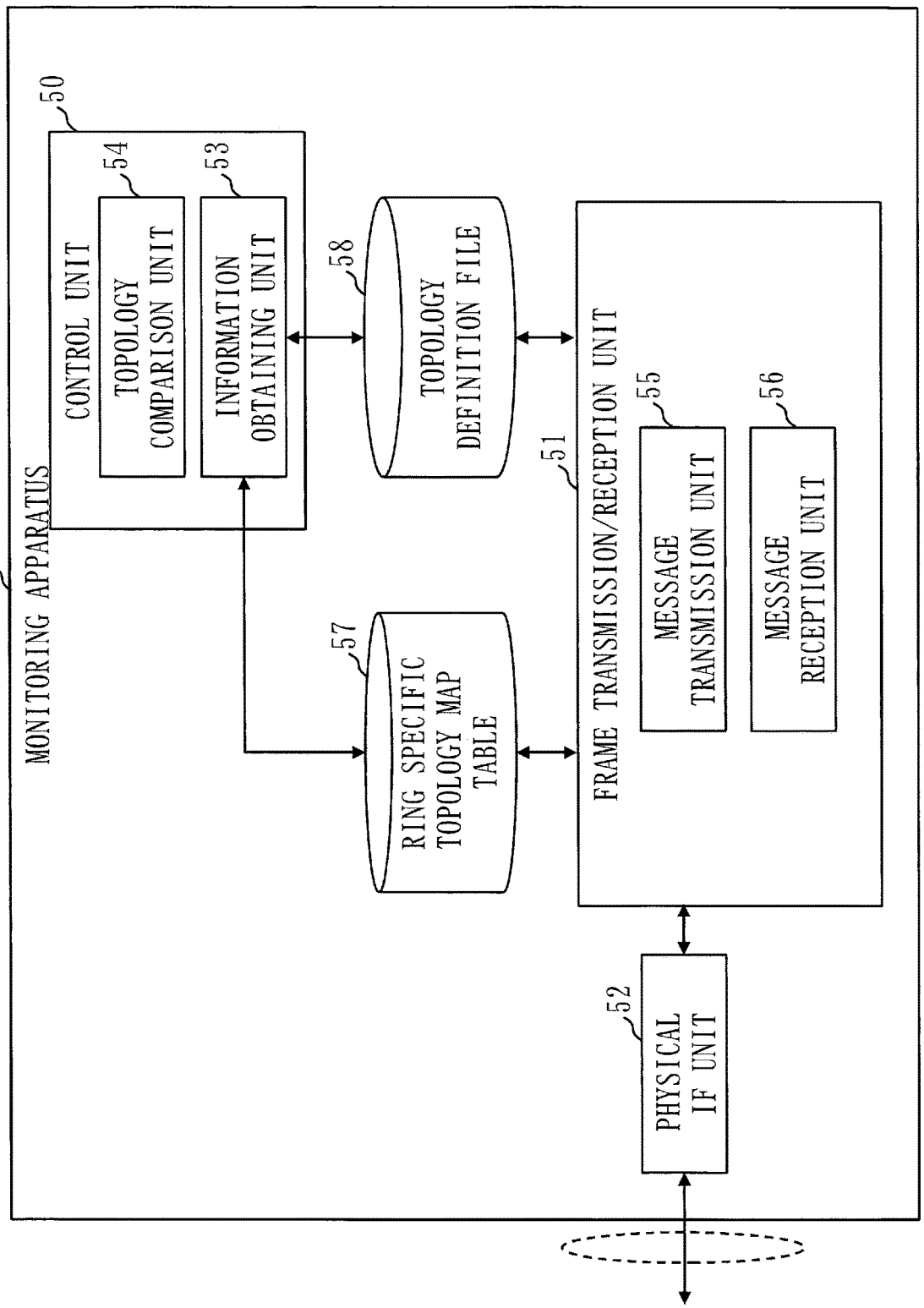
FIG. 4 is a block diagram illustrating a functional configuration of the monitoring apparatus according to Embodiment 1.

As illustrated in FIG. 4, the monitoring apparatus 40 includes, as functional elements, a control unit 50, a frame transmission/reception unit 51, and a physical interface unit 52. The control unit 50 includes an information obtaining unit 53 and a topology comparison unit 54. The frame transmission/reception unit 51 includes a message transmission unit 55 and a message reception unit 56.

The information obtaining unit 53 of the control unit 50 has a function to control the frame transmission/reception unit 51 to give instructions to transmit/receive a command frame for obtaining necessary topology information from the node device 10. The topology comparison unit 54 of the control unit 50 has a function to compare topology information recorded periodically in a topology definition file 58 beforehand with information in a ring specific topology map table 57 which has recorded topology information collected from the node device 10, and output a comparison result. An output format of the comparison result may be in an arbitrary format, but in this embodiment, a format to display the comparison result on a screen of a display not illustrated in the drawings is used. Specifically, the comparison result is a confirmation result of whether or not the topology information recorded in the topology definition file 58 and topology information for each ring received from the node device 10 recorded in the ring specific topology map table 57 match. Functions of the control unit 50 are realized by software. Specifically, the functions of the control unit 50 are realized by a monitoring program. The monitoring program is a program that makes a computer execute processes performed by the information obtaining unit 53 and the topology comparison unit 54 as an information obtaining process and a topology comparison process, respectively. The monitoring program may be provided being recorded in a computer-readable medium, provided being stored in a recording medium, or provided as a program product.

The frame transmission/reception unit 51 has a function to transmit/receive a command frame to collect the topology information for each ring from the node device 10 and to write into the ring specific topology map table 57 the topology information collected according to instructions from the control unit 50. The message transmission unit 55 of the frame transmission/reception unit 51 has a function to generate and transmit a message for collecting information to the node device 10 according to instructions from the control unit 50. The message reception unit 56 of the frame transmission/reception unit 51 has a function to take out topology information from a message received from the node device 10 and write into the ring specific topology map table 57. Functions of the frame transmission/reception unit 51 are realized by the MAC functional circuit 43.

The physical interface unit 52 has an interface function to connect to the node device 10. The functions of the physical interface unit 52 are realized by the network interface 44.

The processor 41 is a device that executes the monitoring program. The processor 41 is, for example, a CPU.

The memory 42 is a device that stores the monitoring program beforehand or temporarily. The memory 42 is, for example, a RAM, a flash memory, or a combination of these.

The ring specific topology map table 57 and the topology definition file 58 are also stored in the memory 42.

The MAC functional circuit 43 is a circuit that realizes the functions of the frame transmission/reception unit 51. The MAC functional circuit 43 is, for example, a single circuit, a composite circuit, a programmed processor, a parallel programmed processor, a logic IC, a GA, an FPGA, an ASIC, or a combination of some or all of these.

The network interface 44 includes a receiver that receives data from each node of the ring network to where the node device 10 belongs and a transmitter that transmits data to each node of the ring network. The network interface 44 is, for example, a communication chip or an NIC.

The monitoring program is read into the processor 41 from the memory 42 and executed by the processor 41. Not only the monitoring program, but also the OS is stored in the memory 42. The processor 41 executes the monitoring program while executing the OS. A part or all of the monitoring program may be built into the OS.

The monitoring program and the OS may be stored in the auxiliary storage device. The auxiliary storage device is, for example, an HDD, a flash memory, or a combination of these. When stored in the auxiliary storage device, the monitoring program and the OS are loaded into the memory 42 and executed by the processor 41.

The monitoring apparatus 40 may include a plurality of processors that replace the processor 41. These plurality of processors share the execution of the monitoring program. Each processor is, for example, a CPU.

Data, information, signal values, and variable values used, processed, or outputted by the monitoring program are stored in the memory 42, the auxiliary storage device, or a register or a cache memory in the processor 41.

A configuration example of a network system 60 according to this embodiment will be described by referring to FIG. 5.

The network system 60 includes the monitoring apparatus 40 and a plurality of node devices 10 that are nodes of the ring network.

Figure 5:
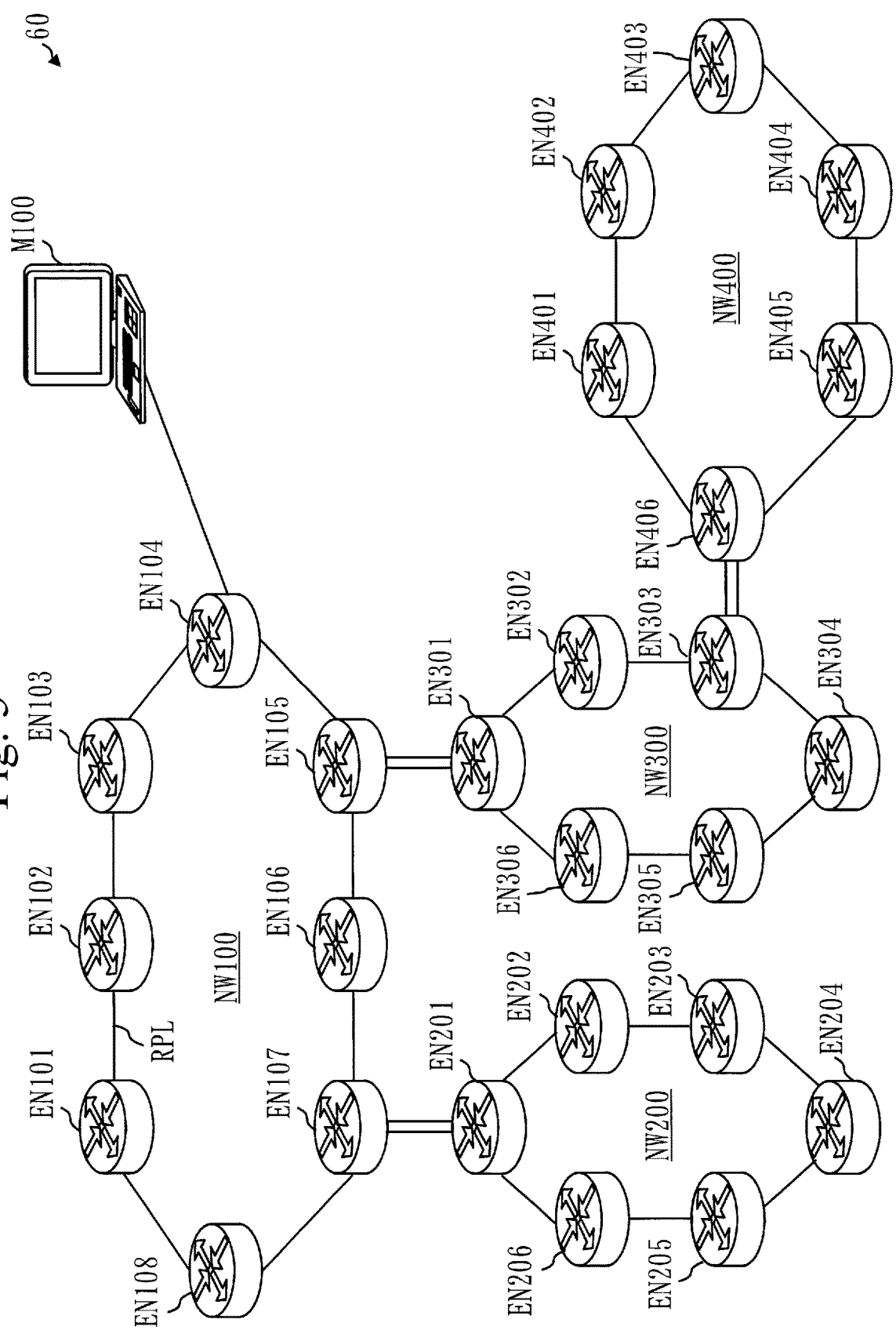
FIG. 5 is a diagram illustrating a configuration example of a network system according to Embodiment 1.

In the network system 60 exemplified in FIG. 5, M100 is a monitoring apparatus 40. NW100, NW200, NW300, and NW400 are ring networks. EN101 to EN108 are ERP nodes that configure NW100. EN201 to EN206 are ERP nodes that configure NW200. EN301 to EN306 are ERP nodes that configure NW300. EN401 to EN406 are ERP nodes that configure NW400. Each ERP node is a node device 10.

In the network system 60 exemplified in FIG. 5, NW100 and NW200 are connected through EN107 and EN201. NW100 and NW300 are connected through EN105 and EN301. NW300 and NW400 are connected through EN303 and EN406. In a multi-ring network, a network to which a plurality of rings are connected as described, topology information of the ring network is generated in each ERP node by exchanging information between ERP nodes. Then, M100 reads the topology information generated in each ERP node and confirms whether or not a network built is connected according to network design.

Description of Operation

Operation of the network system 60 according to this embodiment will be described by referring not only to FIG. 1 to FIG. 5, but to FIG. 6 to FIG. 12. The operation of the network system 60 corresponds to a topology management method according to this embodiment.

Operation of the node device 10 generating topology information will be described using the example in FIG. 5. The operation to be described hereinafter is operation of a node that belongs to NW100, but the nodes that belong to NW200, NW300, and NW400 also operate similarly. In the example of FIG. 5, the ring network interface 14 is used for a ring network connection and the local link interface 15 is used for a connection between rings.

In an ERP network, there are generally an RPL owner node, an RPL adjacent node, and other nodes. "RPL" is an abbreviation for Ring Protection Link. In this embodiment, the other nodes are called general nodes. The general nodes such as EN107, EN105, and the like in NW100 that connect the ring networks to each other are called inter-network nodes.

In NW100, EN101 is an RPL owner node. EN102 is an RPL adjacent node. EN103 to EN108 are general nodes. In an ERP ring network, a line that directly connects the RPL owner node and the RPL adjacent node is called an RPL and is not used in a normal communication. In the example of FIG. 5, a line between EN101 and EN102 is an RPL.

Figure 7:
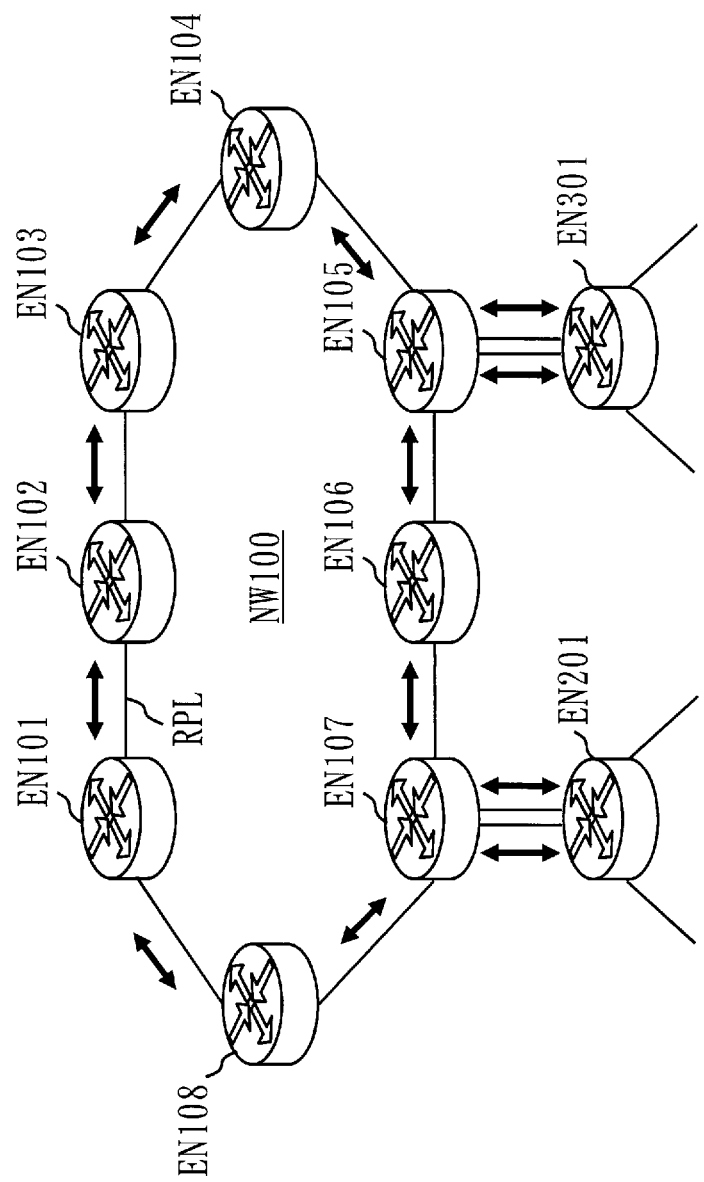
FIG. 7 is a diagram illustrating an example of an exchange of the adjacent node information according to Embodiment 1.

After being started, the node device 10 periodically transmits/receives adjacent node information illustrated in FIG. 6 by Link-by-Link as illustrated by double sided arrows in FIG. 7 to collect the adjacent node information. In this embodiment, the adjacent node information is also transmitted/received in an RPL specific to the ERP network. The adjacent node information received from the adjacent node is written into the memory 12 as a part of the node information 31.

When the node device 10 detects that a general node having a different ring ID became connected to the local link interface 15 based on the adjacent node information, the node device 10 identifies an attribute of the node device 10 as an inter-network node. "ID" is an abbreviation for Identifier.

Figure 9:
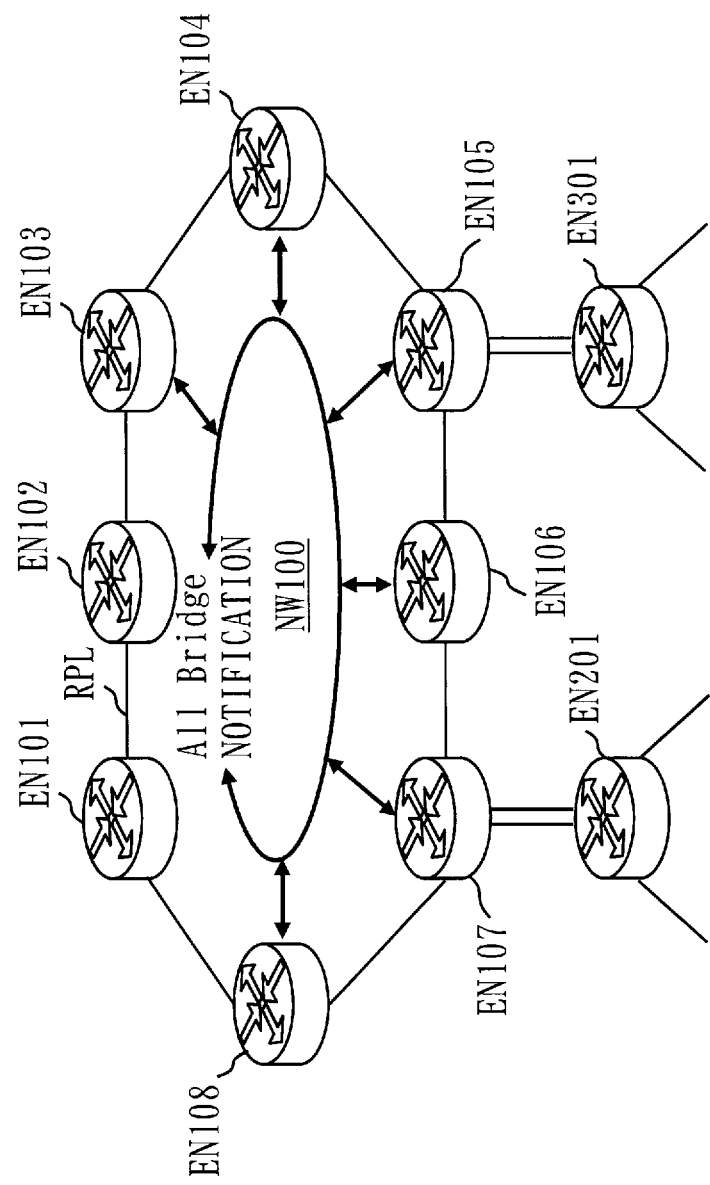
FIG. 9 is a table illustrating an example of sharing of other node information according to Embodiment 1.

After an adjacent connection state has been made steady, the node device 10 transmits/receives information illustrated in FIG. 8 by All Bridge on a main line of a ring as in FIG. 9 and collects other node information. In this embodiment, a frame in the other node information is not sent out onto the RPL. The other node information received from the other nodes on the ERP network is also written into the memory 12 as a part of the node information 31.

After receiving the other node information, the node device 10 manages information of serial numbers 4 to 8 illustrated in FIG. 8 in MAC address order in a table and calculates a unique value such as a CRC32, a hash value, or the like of the table. MAC address order may be in descending order, but in this embodiment, MAC address order is in ascending order.

The node device 10 transmits/receives by All Bridge on the main line of the ring, the unique value calculated and compares the unique value the node device 10 calculated with a unique value the other node calculated. If the values are the same, the node device 10 recognizes that every ERP entry in the ring is detected.

After confirming that unique values received from all other nodes on the main line of the ring are the same as the value calculated in the node device 10, the node device 10 generates topology information as illustrated in FIG. 10 based on the node information 31 in connection order on the main line of the ring. Although the topology map table 32 created by EN106 is illustrated as an example in FIG. 10, nodes other than EN106 also create similar topology map tables 32.

In the topology information generated by the node device 10, connection information of an ERP node with a different ring ID is included. In the example of FIG. 10, connection information of EN201 and EN301 are included. In the topology map table 32 of FIG. 10, EN106 which is the node that generated the topology information is set as a starting point. Consequently, "Hop Count" of EN106 for each of "Main Line Port 1" and "Main Line Port 2" is 0. "Main Line Port 1" is a clockwise hop count in FIG. 5 and "Main Line Port 2" is a counterclockwise hop count. "Inter-network Connection" is a link aggregation port in a case where "Node Type" is inter-network node. "MAC Address" is a MAC address of each node. "Node Type" is a node type of each node. "Ring ID" is a ring ID set in each node beforehand. "Inter-network Node MAC Address" is a MAC address of an inter-network node to which a node with a different ring ID is connected.

Topology detection operation of the node device 10 will be described on a more detailed level.

Figure 11:
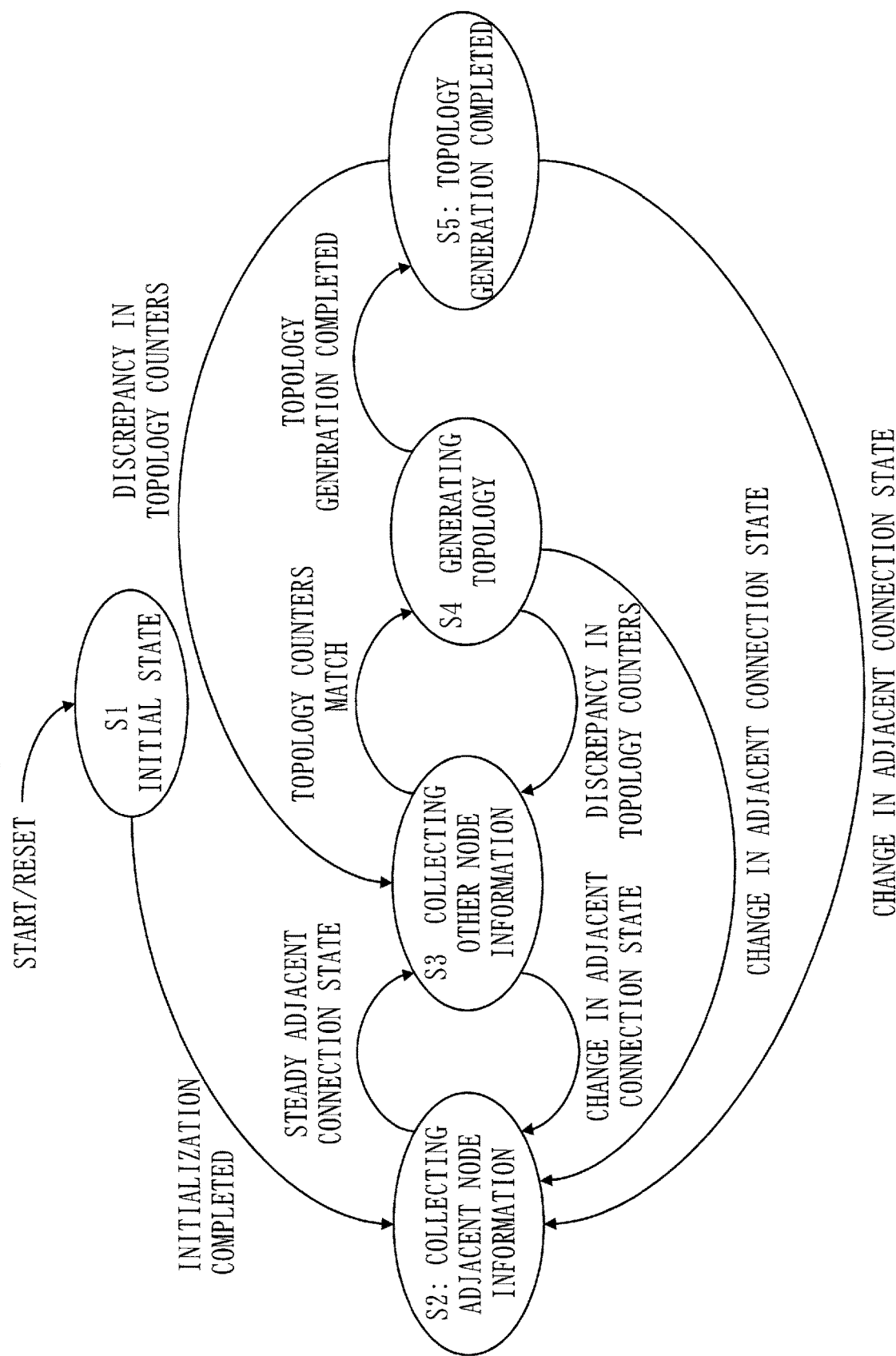
FIG. 11 is a diagram illustrating a state machine of the node device according to Embodiment 1.

FIG. 11 illustrates a state machine to be implemented on the control unit 20 of the node device 10.

S1 is an initial state. The initial state is a state where ERP initialization is performed. In this state, a switch port is set to a learning state, a forwarding table is cleared, and an ERP daemon is started.

S2 is a state where the node device 10 detects an ERP node that is adjacent. In this state, as illustrated in FIG. 7, operation to periodically transmit adjacent node information by Link-by-Link is started. An ID specific to the node device 10 is included in the adjacent node information. Thereby, an adjacent node is notified that a transmission source is the node device 10.

Furthermore, an adjacent ERP detection function is started in this state. Thereby, the adjacent node information is received from an adjacent node and information in the format illustrated in FIG. 6 is stored. Specifically, information indicating a MAC address, a ring ID, a node type, and a frame transmission port of a transmission source node is stored. Of the ring ID and the node type, as for the RPL owner node and the RPL adjacent node, values set by a maintenance person are notified. The node type is one of an RPL owner node, an RPL adjacent node, an inter-network node, and a general node. In a case where the node device 10 detects an ERP node connected to an arbitrary LAN port, the node device 10 recognizes the node as an inter-network node. The node device 10 selects a node type in order of priority, an RPL owner node=an RPL adjacent node > an inter-network node > a general node.

S3 is a state where the node device 10 detects other ERP nodes excluding the ERP node that is adjacent. In this state, as illustrated in FIG. 9, operation to transmit/receive the other node information between each other by All Bridge on a main line of a ring is started.

Furthermore, in this state, the counter management unit 27 is enabled. In the counter management unit 27, after the other node information is received, the information of serial numbers 4 to 8 illustrated in FIG. 8 are managed in MAC address order in the table, and a CRC32 or a hash value of the table is calculated as a topology counter value. MAC address order may be in descending order, but in this embodiment, MAC address order is in ascending order. The topology counter value periodically forwarded by All Bridge from a node on the main line of the ring and the topology counter value calculated by the counter management unit 27 are collated.

S4 is a state where topology information is generated based on information collected. The control unit 20 starts the table creation unit 25, confirms a connection state of each node based on the node information 31 of the node management unit 26, and generates topology information of the ring network. In the topology map table 32 illustrated in FIG. 10, a connection relation in the ring to which eight nodes from EN101 to EN108 are connected where the ring ID=1 is indicated. A connection relation between a ring where the ring ID=1 and two nodes, EN201 where the ring ID=2 and EN301 where the ring ID=3, is also indicated.

Entries in the topology map table 32 are generated based on nodes having a ring ID of the ring network to where the node device 10 belongs. Entries of nodes with different ring IDs are generated in ascending order of the ring IDs. Then, the table is sorted so that the node device 10 is at the top of the table and the hop counts of Port 1 are in ascending order.

S5 is a state where topology generation in the ring network is completed. If a discrepancy is found in the topology counters again, a transition to S3 occurs. When a change in the adjacent connection state such as a broken link, an addition of an adjacent node, or the like are detected, a transition to S2 occurs.

As described above, the plurality of node devices 10 of the network system 60 create topology map information based on information obtained by an exchange of information and sharing of information between the nodes that belong to the ring network. In this embodiment, the information obtained by each node device 10 by the exchange information and the sharing of information is stored in the memory 12 as the node information 31. The topology map information is the topology information that indicates a connection relation between nodes in the ring network. In this embodiment, the topology map information created by each node device 10 is stored in the memory 12 as the topology map table 32.

The plurality of node devices 10 of the network system 60 perform the exchange of information between the nodes adjacent to each other via both a block link and remaining links of the links between the nodes adjacent to each other. The block link is between an owner node which is one of the nodes that belong to the ring network and an adjacent node adjacent to the owner node. The block link is blocked in a normal condition to avoid a loop. In this embodiment, the RPL correspond to the block link.

The plurality of node devices 10 of the network system 60 perform the exchange of information between the nodes adjacent to each other also via a link between a node, of the nodes that belong to the ring network, connected to an inter-network node that belongs to a ring network other than the ring network and the inter-network node.

The plurality of node devices 10 of the network system 60 perform the sharing of information by notifying each node of the information obtained by the exchange of information via the remaining links excluding the block link.

The plurality of node devices 10 of the network system 60 encode the information obtained by the exchange of information and the sharing of information with a common procedure and notify each node of a code obtained via the remaining links. If the code obtained in each node matches another, these plurality of node devices 10 create topology map information based on the information obtained by the exchange of information and the sharing of information. In this embodiment, a CRC32 or a hash value is calculated as a code.

The monitoring apparatus 40 has every piece of topology information of NW100, NW200, NW300, and NW400 beforehand. From the plurality of node devices 10 that belong to NW100, NW200, NW300, and NW400, the monitoring apparatus 40 collects the topology information that these plurality of node devices 10 generated. The monitoring apparatus 40 confirms whether or not an entire multi-ring network is of a desired network configuration by collating the topology information collected and the topology information that the monitoring apparatus 40 has.

Collating operation in the monitoring apparatus 40 will be described.

The monitoring apparatus 40, by instructions from the control unit 50, transmits a frame that is in accordance with an arbitrary protocol such as an SNMP and the like to each node device 10 in the network from the message transmission unit 55 of the frame transmission/reception unit 51, via the physical interface unit 52. The monitoring apparatus 40 receives by the message reception unit 56, a response from each node device 10 received from the physical interface unit 52, separates the topology map information for each ring from the frame, and writes the topology map information that each node device 10 has as the topology map table 32 into the ring specific topology map table 57.

The monitoring apparatus 40 has topology definition information set beforehand in the topology definition file 58. According to instructions from the control unit 50, the monitoring apparatus 40 makes a comparison between the topology definition file 58 and the information stored in the ring specific topology map table 57 in the topology comparison unit 54. The topology definition file 58, as with the ring specific topology map table 57, may include topology information for each ring ID and information of the inter-network node of the adjacent ring or may include topology information of the entire multi-ring network.

By comparing in each ring, the topology information that each node device 10 has with the topology information that the monitoring apparatus 40 has, the monitoring apparatus 40 determines whether or not there is a topology map abnormality.

A specific procedure is as described hereinafter.

Figure 12:
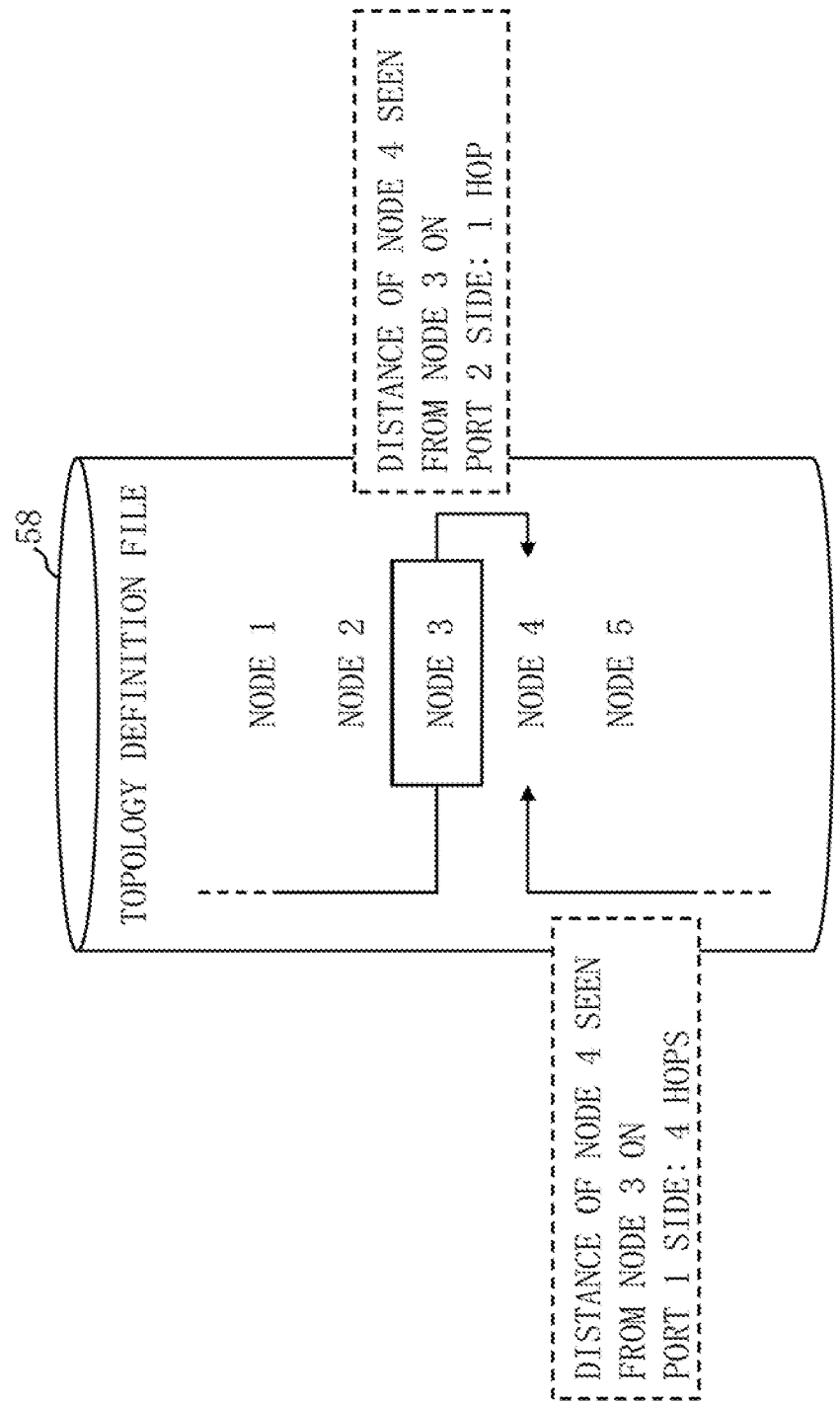
FIG. 12 is a diagram illustrating an example of collating a topology definition file according to Embodiment 1.

When topology map information is obtained from node ENn, the monitoring apparatus 40 perform a check as illustrated in FIG. 12 on node ENm in the topology definition file 58. If even one of conditions hereinafter is not satisfied, the monitoring apparatus 40 verifies that a topology map abnormality has occurred for node ENm. The check is performed in order on all defined nodes as node ENm.

Condition 1: Node ENm exists in the topology map.

Condition 2: A distance between node ENm and a Port 1 side of node ENn in a definition file is equal to a distance of a node ENm entry on the topology map.

Condition 3: A distance between node ENm and a Port 2 side of node ENn in the definition file is equal to a distance of a node ENm entry on the topology map.

Node ENn is managed as a topology map abnormality detection source node of node ENm. Then, a check is carried out for a next node in the definition file.

Information on or a state of the topology map, a topology map abnormal state, the topology map abnormality detection source node, and the like are reset for every monitoring cycle, and detection is performed by always using the information obtained in a last monitoring cycle.

As described above, the information obtaining unit 53 of the monitoring apparatus 40 obtains, from each node, the topology map information created in each node by the exchange of information and the sharing of information between the nodes that belong to the ring network. As described above, the topology map information is the information that indicates the connection relation between the nodes in the ring network. In this embodiment, the topology map information obtained, from each node, by the information obtaining unit 53 is saved in the memory 42 as the ring specific topology map table 57.

The topology comparison unit 54 of the monitoring apparatus 40 compares the topology map information obtained, from each node, by the information obtaining unit 53 with topology definition information retained in the memory 42 beforehand, and determines whether or not the configuration of the ring network is according to design. The topology definition information is information that defines the connection relation between the nodes in the ring network. In this embodiment, the topology definition information is stored in the memory 42 beforehand as the topology definition file 58.

When information of other node ENm defined in the topology definition information, other node ENm being a node that belongs to the ring network, is not included in topology map information In obtained from node ENn by the information obtaining unit 53, the topology comparison unit 54 determines that the configuration of the ring network is not according to design.

If there is a discrepancy in a distance from node ENn to node ENm in a first direction between the topology map information In and the topology definition information, the topology comparison unit 54 determines that the configuration of the ring network is not according to design.

If there is a discrepancy in a distance from node ENn to node ENm in a second direction, which is opposite of the first direction, between the topology map information In and the topology definition information, the topology comparison unit 54 determines that the configuration of the ring network is not according to design.

Description of Effect of Embodiment

In this embodiment, whether or not the configuration of the ring network is according to design is determined by a comparison between the topology map information created in each node in the ring network and the topology definition information retained in the memory 42 beforehand. Consequently, according to this embodiment, whether or not the configuration of the ring network is of a desired configuration can be easily confirmed.

In this embodiment, information for determining in the monitoring apparatus 40 in an easy method that an adjacent connection relation of the rings in the multi-ring network is normal is collected in the node. According to this embodiment, whether or not the topology map information that the nodes in each ring configuring the multi-ring network retain is consistent between the nodes in the ring can be determined in the monitoring apparatus 40 in an easy method.

According to this embodiment, in the ring network configured of ERP nodes exemplified in FIG. 5, a topology abnormality can be detected by an easy manner in which the topology information that the monitoring apparatus 40 retains and the topology information that each node generated are collated.

Other Configurations

In this embodiment, the functions of the control unit 20 of the node device 10 are realized by software, but as a variation, the functions of the control unit 20 may be realized by hardware. With regard to this variation, difference from this embodiment will mainly be described.

Figure 13:
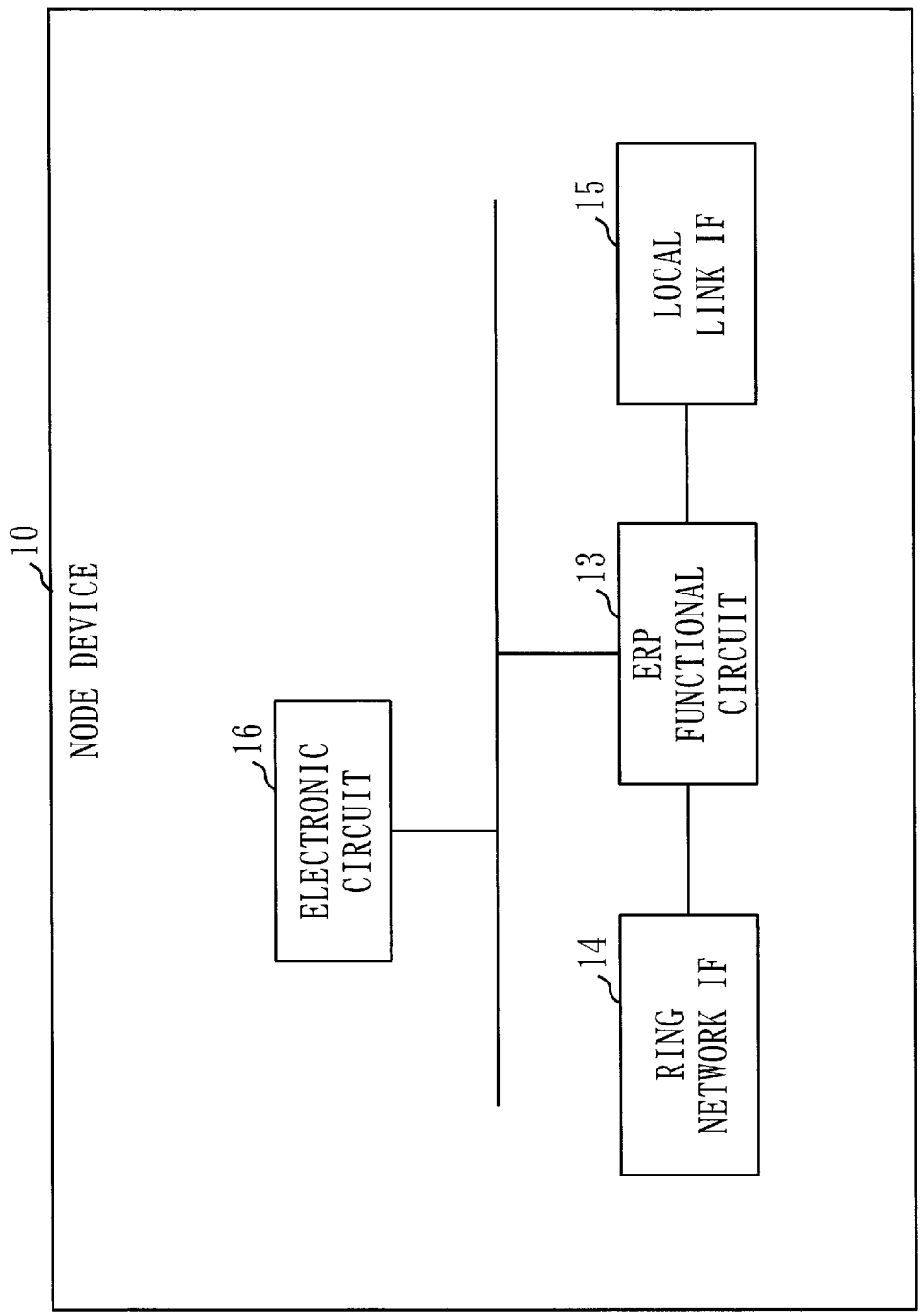
FIG. 13 is a block diagram illustrating a hardware configuration of a node device according to a variation of Embodiment 1.

A configuration of the node device 10 according to the variation of this embodiment will be described by referring to FIG. 13.

The node device 10 includes hardware such as an electronic circuit 16, the ERP functional circuit 13, the ring network interface 14, and the local link interface 15.

The electronic circuit 16 is dedicated hardware that realizes the functions of the control unit 20. The electronic circuit 16 is, for example, a single circuit, a composite circuit, a programmed processor, a parallel programmed processor, a logic IC, a GA, an FPGA, an ASIC, or a combination of some or all of these.

The node device 10 may include a plurality of electronic circuits that replace the electronic circuit 16. These plurality of electronic circuits, as a whole, realize the functions of the control unit 20. Each electronic circuit is, for example, a single circuit, a composite circuit, a programmed processor, a parallel programmed processor, a logic IC, a GA, an FPGA, an ASIC, or a combination of some or all of these.

As another variation, the functions of the control unit 20 may be realized by a combination of software and hardware. That is, a part of the functions of the control unit 20 may be realized by dedicated hardware and the rest may be realized by software.

Each of the processor 11 and the electronic circuit 16 is a processing circuitry. That is, even if a hardware configuration of the node device 10 is as the configuration illustrated in either one of FIG. 1 and FIG. 13, operation of the control unit 20 is performed by the processing circuitry.

In this embodiment, the functions of the control unit 50 of the monitoring apparatus 40 are realized by software, but as a variation, the functions of the control unit 50 may be realized by hardware. With regard to this variation, difference from this embodiment will mainly be described.

Figure 14:
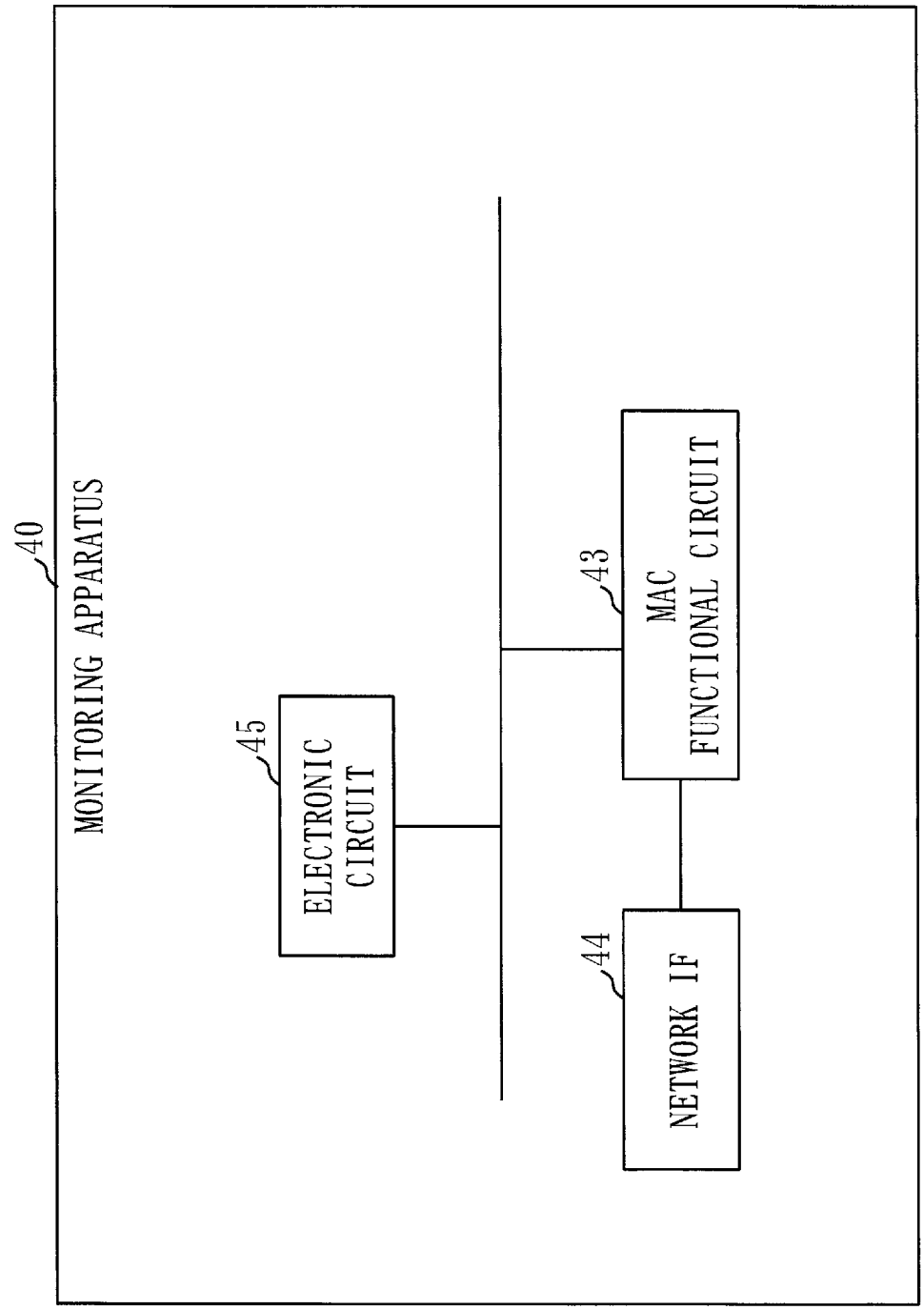
FIG. 14 is a block diagram illustrating a hardware configuration of a monitoring apparatus according to a variation of Embodiment 1.

A configuration of the monitoring apparatus 40 according to the variation of this embodiment will be described by referring to FIG. 14.

The monitoring apparatus 40 includes hardware such as an electronic circuit 45, the MAC functional circuit 43, and the network interface 44.

The electronic circuit 45 is dedicated hardware that realizes the functions of the control unit 50. The electronic circuit 45 is, for example, a single circuit, a composite circuit, a programmed processor, a parallel programmed processor, a logic IC, a GA, an FPGA, an ASIC, or a combination of some or all of these.

The monitoring apparatus 40 may include a plurality of electronic circuits that replace the electronic circuit 45. These plurality of electronic circuits, as a whole, realize the functions of the control unit 50. Each electronic circuit is, for example, a single circuit, a composite circuit, a programmed processor, a parallel programmed processor, a logic IC, a GA, an FPGA, an ASIC, or a combination of some or all of these.

As another variation, the functions of the control unit 50 may be realized by a combination of software and hardware. That is, a part of the functions of the control unit 50 may be realized by dedicated hardware and the rest may be realized by software.

Each of the processor 41 and the electronic circuit 45 is a processing circuitry. That is, even if a hardware configuration of the monitoring apparatus 40 is as the configuration illustrated in either one of FIG. 3 and FIG. 14, operation of the control unit 50 is performed by the processing circuitry.

This embodiment is applicable to ring networks other than the ERP network.

REFERENCE SIGNS LIST

10: node device, 11: processor, 12: memory, 13: ERP functional circuit, 14: ring network interface, 15: local link interface, 16: electronic circuit, 20: control unit, 21: ERP functional unit, 22: physical interface unit, 23: physical interface unit, 24: LAN interface unit, 25: table creation unit, 26: node management unit, 27: counter management unit, 28: ERP communication unit, 29: message transmission unit, 30: packet delivery unit, 31: node information, 32: topology map table, 40: monitoring apparatus, 41: processor, 42: memory, 43: MAC functional circuit, 44: network interface, 45: electronic circuit, 50: control unit, 51: frame transmission/reception unit, 52: physical interface unit, 53: information obtaining unit, 54: topology comparison unit, 55: message transmission unit, 56: message reception unit, 57: ring specific topology map table, 58: topology definition file, 60: network system.

The invention claimed is:

1. A monitoring apparatus comprising:
processing circuitry to:
obtain from a plurality of nodes, topology map information that is created in each node by an exchange of information and sharing of information between the plurality of nodes that belong to a ring network, and that indicates a connection relation between the nodes in the ring network and information of an inter-network node that belongs to a ring network other than the ring network, and
compare a plurality of pieces of topology map information obtained from the plurality of nodes with topology definition information retained in a memory beforehand that defines the connection relation between the nodes in the ring network and the information of the inter-network node that connects the ring networks to each other, and to determine whether or not a configuration of the ring network is according to design.

2. The monitoring apparatus according to claim 1, wherein the processing circuitry determines that the configuration of the ring network is not according to design when information of other node defined in the topology definition information, the other node being a node that belongs to the ring network, is not included in topology map information obtained from one of the nodes in the plurality of nodes.

3. The monitoring apparatus according to claim 2, wherein the processing circuitry determines that the configuration of the ring network is not according to design when, between the topology map information and the topology definition information, either there is a discrepancy in a distance from the one of the nodes in the plurality of nodes to the other node in a first direction, or there is a discrepancy in a distance from the one of the nodes in the plurality of nodes to the other node in a second direction opposite from the first direction.

4. A network system comprising:
the monitoring apparatus according to claim 1; and
a plurality of node devices, each of which is a node of the ring network.

5. The network system according to claim 4, wherein the plurality of node devices perform the exchange of information between the nodes adjacent to each other via both a block link and remaining links of the links between the nodes adjacent to each other, wherein the block link is a link between an owner node which is one of the nodes that belong to the ring network, and an adjacent node adjacent to the owner node, and the block link is blocked in a normal condition to avoid a loop.

6. The network system according to claim 5, wherein the plurality of node devices perform the exchange of information between the nodes adjacent to each other also via a link between a node, of the nodes that belong to the ring network, connected to an inter-network node that belongs to a ring network other than the ring network and the inter-network node.

7. The network system according to claim 5, wherein the plurality of node devices perform the sharing of information by notifying each node of the information obtained by the exchange of information via the remaining links excluding the block link.

8. The network system according to claim 5, wherein the plurality of node devices encode the information obtained by the exchange of information and the sharing of information with a common procedure, notify each node of a code obtained via the remaining links, and if the code obtained in each node matches another, create the topology map information based on the information obtained by the exchange of information and the sharing of information.

9. A topology management method comprising:
creating, based on information obtained from an exchange of information and sharing of information between a plurality of nodes that belong to a ring network, a plurality of pieces of topology map information that indicates a connection relation between the nodes in the ring network and information of an inter-network node that belongs to a ring network other than the ring network, by each of a plurality of node devices, each of which is a node of the ring network; and
obtaining the plurality of pieces of topology map information created by the plurality of node devices, comparing the plurality of pieces of topology map information obtained with topology definition information retained in a memory beforehand that defines the connection relation between the nodes in the ring network and the information of the inter-network node that connects the ring networks to each other, and determining whether or not a configuration of the ring network is according to design, by a monitoring apparatus.

10. A non-transitory computer readable medium storing a monitoring program causing a computer to execute:
an information obtaining process to obtain from a plurality of nodes, topology map information that is created in each node by an exchange of information and sharing of information between the plurality of nodes that belong to a ring network, and that indicates a connection relation between the nodes in the ring network and information of an inter-network node that belongs to a ring network other than the ring network; and
a topology comparison process to compare a plurality of pieces of topology map information obtained from the plurality of nodes by the information obtaining process with topology definition information retained in a memory beforehand that defines the connection relation between the nodes in the ring network and the information of the inter-network node that connects the ring networks to each other, and to determine whether or not a configuration of the ring network is according to design.

* * * * *